United States Patent [19]

Hunter et al.

[11] Patent Number: 4,823,311

[45] Date of Patent: Apr. 18, 1989

[54] CALCULATOR KEYBOARD WITH USER DEFINABLE FUNCTION KEYS AND WITH PROGRAMMABLY ALTERABLE INTERACTIVE LABELS FOR CERTAIN FUNCTION KEYS

[75] Inventors: Arthur C. Hunter, Wylie; Linda J. Ferrio, Plano, both of Tex.

[73] Assignee: Texas Instruments Incorporated, Dallas, Tex.

[21] Appl. No.: 868,987

[22] Filed: May 30, 1986

[51] Int. Cl.⁴ .............................................. G06F 3/02
[52] U.S. Cl. .............................. 364/900; 364/709.14; 364/710.14; 340/712; 341/23
[58] Field of Search ... 364/200 MS File, 900 MS File, 364/709, 710; 340/365 VL, 365 R, 711, 712

[56] References Cited

U.S. PATENT DOCUMENTS

| | | | |
|---|---|---|---|
| 3,425,627 | 1/1984 | Eibner | 364/900 |
| 4,078,257 | 3/1978 | Bagley | 364/900 |
| 4,145,742 | 3/1979 | Olander, Jr. et al. | 364/709 |
| 4,208,720 | 6/1980 | Harrison | 364/709 |
| 4,333,097 | 6/1982 | Buric et al. | 340/365 R X |
| 4,385,366 | 5/1983 | Housey, Jr. | 364/900 |
| 4,481,598 | 11/1984 | Ishiwata | 364/710 |
| 4,647,911 | 3/1987 | Maegawa et al. | 340/365 R |
| 4,667,299 | 5/1987 | Dunn | 364/70 P |
| 4,680,729 | 7/1987 | Steinhart | 364/900 |

Primary Examiner—Raulfe B. Zache
Assistant Examiner—Florin Munteanu
Attorney, Agent, or Firm—William E. Hiller; N. Rhys Merrett; Melvin Sharp

[57] ABSTRACT

Calculator having a keyboard in which one or more keys have labels created by a display and subject to changing interactively as the user desires. Typically, advanced scientific-programmable calculators may have too many functions to be adequately included on the keys of the keyboard associated therewith. In such calculators, certain functions require a plurality of keys to be actuated in order to be performed. Thus, such keyboards tend to be cluttered an confusing to the user. Thus, a keyboard is proposed having a small number of keys labeled with different functional labels as the user proceeds through a menu or tree structure containing all the desired functions. Keys in a certain group of keys on the keyboard are thereby subject to redefinition or relabeling so as to provide a variety of functions.

8 Claims, 5 Drawing Sheets

CALCULATOR KEYBOARD WITH USER DEFINABLE FUNCTION KEYS AND WITH PROGRAMMABLY ALTERABLE INTERACTIVE LABELS FOR CERTAIN FUNCTION KEYS

This invention relates generally to a data processing apparatus having a keyboard with a plurality of keys of entering data into the data processing unit of the apparatus, wherein the keys are required to have more than one function and must be labelled in some manner to identify the respective functions therefor. More particularly, this invention concerns an electronic calculator having a keyboard in which oe or more keys have labels visually observable on a display associated with the keys wherein the respective keys labels may be changed interactively as the operator of the calculator desires.

BACKGROUND OF THE INVENTION

It is most often advantageous in data processing devices to have an ability and a flexibility to change functional operating capabilities so as to enhance the versatility of the data processing devie in a variety of situations where different data solutions are required. Sucn function-changing of a data processng device may typically involve the use of a keyboard having a plurality of keys which may be assigned dual functions, or in a more complex environment three or more functions, with respective mode keys to denote which particular function applies to a given key at any one time instant.

For example, a simple four-function electronic calculator may have four individual operation mode keys respectively labelled as the four basis arithmetic functions—addition, subtraction, multiplication and division. In this instance, the number of keys required for a keyboard of a calaculator of this character is not excessive, thereby creating no problem in key-labelling. As the complexity of the data processing device increases, however, the matter of key-labelling begins to create a problem because of the added functions required by the device and the restrictions space and operability place upon the type of key-labelling to be used on the keyboard of such a device. Thus, by adding the trigonometric functions of sine, cosine, tangent and are cosine to the calculator, more keys having the appropriate labels applied thereto are required for the keyboard.

By continuing to add to the functional capability of the calculator, more and more keys are necessary for the keyboard, and a point is reached where keys must serve dual function roles and even beyond if all of the desired functions of the calculator are to be possible via keyboard entry. It will be appreciated that there is some higher limit as to the number of keys which may be added to a keyboard without causing a breakdown in operator performance. In the latter respect, as the number of keys included on a keyboard for a data processing apparatus increases beyond a certain point, operator performance begins to decline and then drops rapidly because of the confusion brought on by the clutter of keys, the difficulty in accomplishing the desired information processing, and intimidation because of keyboard complexity.

Thus, one of the limiting factors in the design of an operator interactive data processing apparatus, such as an electronic calculator, is the human factor in the ability of an operator in properly assessing and understanding the respective keys included in a data entry keyboard having a multiple number of function keys which input data to the processing unit of the apparatus in permitting the apparatus to perform a diverse number of processing applications. Perhaps the human factor limitation achieves its most distinctive character in association with a hand-held calculator, for example, because of the space resstrictions necessary for a keyboard of such a device.

Hand-held calculators have been constructed to perform a wide variety of computational tasks, such as business, basic mathematics, scientific, etc. with keyboards whose layout and number of keys are generally along the same lines with little change in size and complexity. One example of a calculator whose keyboard includes a number of keys at or approaching the upper limit of an operator to reasonably understand and use the keys in the manner for which they are designed in the operation of the calculator is disclosed in U.S. Pat. No. 4,208,720 Harrison. The calculator in U.S. Pat. No. 4,208,720 Harrison is a hand-held calculator with forty keys having seventy-nine labels associated therewith.

One approach toward minimizing the number of keys and labels therefor as required in a data processing apparatus has been the use of separate memory modules, each with its own set of key functions and its own particular computational tasks, with the basic data processing apparatus. In this approach, a plug-in memory module, which may take the form of a read-only-memory (ROM), a programmable read-only-memory (PROM), or a magnetic tape, for example, is electrically connected to the data processing unit of the apparatus by insertion into an appropriate electrical socket provided in the apparatus housing for that purpose. This memory module will supplement the basic operation functions of the data processing appartus with additional functions and supply any necessary new data to enable the data processing apparatus to perform the added functions. The substituion of memory modules in this manner in a data processing apparatus equipped to make use of such memory modules is primarily limited to the augmentation of the permanent functions built into the data processing apparatus, and is of less utility in enabling the data processing apparatus to perform computational tasks based upon significantly different functions attributable to keyboard entry.

Typically, an operator will enter data via a keyboard of the data processing apparatus. Individual keys, which are switches, may be permanently labelled to identify the functions associated therewith. As previously explained, the keys may be given a dual function, or beyond, by the use of appropriate mode keys, which when actuated from one status to another, will cause the functions of the individual keys to change also. Dual-function labelling of keys is commonly found on business-type and scientific-type hand-held calculators in present use. In some instances, the keyboard may include a set of blank or unlabelled keys adapted to be used with various cardboard or plastic overlays bearing appropriate key-function identifying labels. Prior to the present invention, efforts have been made to reduce the clutter of keys on keyboards of sophisticated data processing apparatuses, such as electronic hand-held calculators designed for advanced scientific use. Two such prior efforts are disclosed in U.S. Pat. Nos. 4,078,257 Bagley and 4,385,366 Housey, both of which are hereby incorporated by reference. Bagley and Housey each make use of transparent keys in which the transparency of each key is a visual display. In Bagley, a plurality of display planes each containing preselected symbols is provided. A mode selection key enables one of the display planes to be chosen for viewing through the transparent keys comprising the keyboard as a liquid crystal display, thereby labelling the respective keys of the keyboard with the symbols of the chosen display plane. Housey relies upon the use of a particular plug-in memory module to provide label identification for the plurality of keys via liquid crystal displays visible through each transparent key. The plug-in memory module may be replaced by a different plug-in memory module with a corresponding change in the function labels applicable to the keys. Thus, Bagley is limited to the symbols on specific display planes which may be selectively chosen to identify the functions of the individual keys of the keyboard, whereas Housey is limited to the symbols associated with a particular plug-in memory module as the function labels to be associated with the keys of the keyboard. In each instance, flexibility and versatility of key labelling is somewhat restricted.

SUMMARY OF THE INVENTION

The present invention is directed to a data processing apparatus, a hand-held electronic calculator in a preferred embodiment, having a keyboard in which one or more keys have labels created by a display associated therewith, wherein the labels are subject to being changed interactively as the operator desires. The keyboard for the calculator in accordance with this invention includes a specific group of keys in the overall keyboard which may be said to have a definable function subject to characterization in any one of a plurality of functions. The functions to be assigned to particular keys within this specific group may be defined for one particular operation of the calculator by three different techniques: (1) via the calculator operating system; (2) via library application as provided by a plug-in memory module; and (3) via an operator-defined program. Each of these techniques is therefore available in a single electronic calculator as a means of defining or re-defining the function labels for the specific group of keys whose functions may be re-definable at will according to the desires of the operator.

Such a flexible arrangement enables the definable-function keys to be re-labelled in a virtually limitless manner, thereby enabling the calculator to be designed with a keyboard of significant versatility while remaining uncluttered. The key re-labelling aspect in accordance with the present invention by permitting re-definition of the functions of a select group of keys contributes to the ease of use of the calculator, making it "user friendly".

In a specific aspect of the present invention, the display means of the calculator may include a main display portion where input data and computation results are visually displayed and a dedicated display portion specifically associated with the group of definable-function keys. The dedicated display portion, although part of the display means, is marked by an opaque frame to delineate it from the main display and includes a plurality of windows defined by the frame and arranged in respective proximity to each of the definable-function keys comprising the group of such keys. The display means may be a liquid crystal display or other suitable type, with the windows of the dedicated portion thereof being provided for the purpose of visually displaying the labels in the form of appropriate symbols for the definable-function keys.

The keyboard further includes appropriate application mode keys or "menu" keys to enable labelling the group of definable-function keys in any one of the three techniques previously described. Actuation of an application mode key by a keystroke causes the data processing unit of the calculator to assign a function to each selected key of the definable-function group. A display drive means or graphic means is operably coupled to the dedicated portion of the display means and to the data processing unit so as to provide a visual symbol or symbols in respective windows of the dedicated display portion as labels for each of the selected definable-function keys.

The re-labelling or re-definition of these special definable-function keys ca be accomplished a plurality of times within the same computation application of the calculator such that each definable-function key may assume two or more separate and distinct functions within the same data processing procedure. This plural function aspect for selected ones of the definable-function keys can be achieved by each of the three key-labelling techniques previously mentioned.

While the invention may have general applicability in the re-labelling of keys of a keyboard for a data processing apparatus, it has specific applicability to so-called advanced scientific programmable calculators which typically will have a multiplicity of functions too many in number to fit on the keyboard of such an apparatus, particularly when it is of the hand-held type.

Having briefly summarized the invention, the invention will be described in more detail with reference to the following drawings.

DETAILED DESCRIPTION OF THE INVENTION

Figure 1:
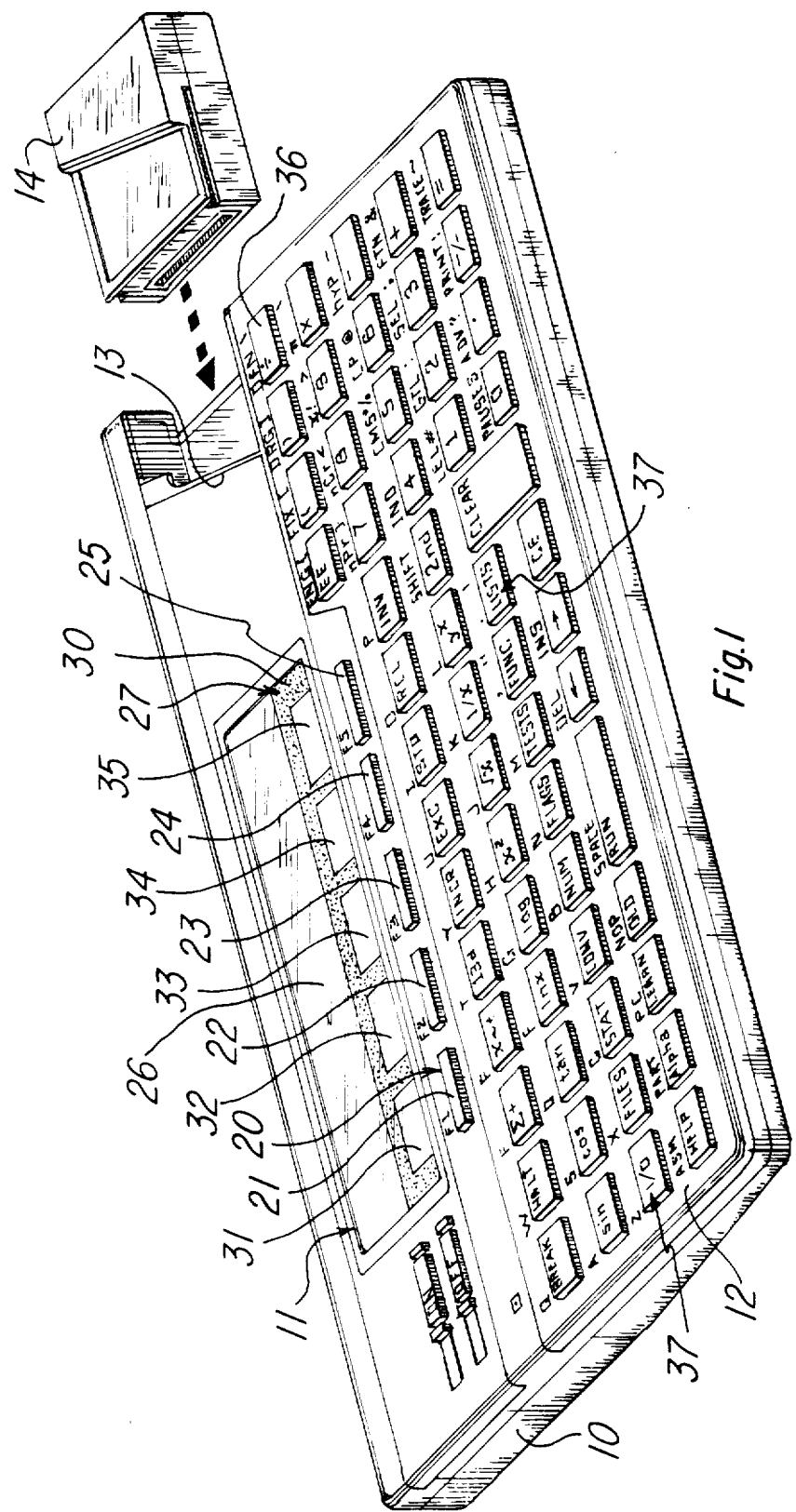
FIG. 1 is a perspective view of a data processing apparatus in the form of an electronic calculator constructed in accordance with the present invention.
Figure 2:
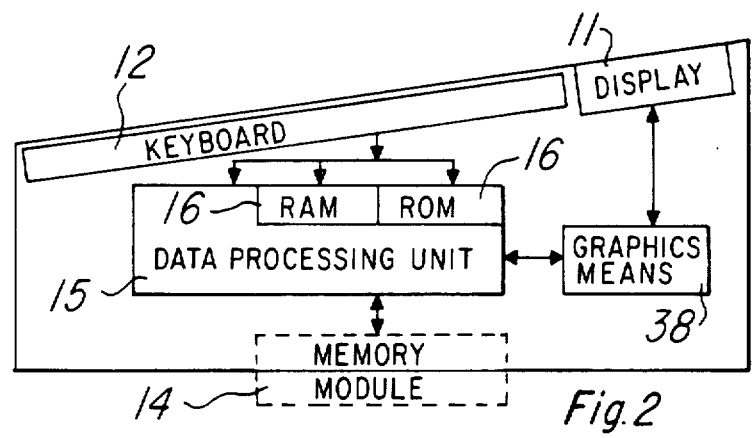
FIG. 2 is a block diagram schematic of the calculator shown in FIG. 1.

Referring more specifically to FIGS. 1 and 2 of the drawings, a data processing apparatus as constructed in accordance with the invention is illustrated in the form of an electronic calculator which comprises an outer housing 10 having a visual display means 11 (preferably a liquid crystal display, although other forms of displays auch as light-emitting diodes could be employed) disposed on the upper portion of the housing 10. The individual keys may be push-button contact switches wherein momentary depression of a respective key completes an electrical contact to generate a data input. Other forms of keys may be suitably employed, such as the capacitance touch sensing type disclosed in U.S. Pat No. 4,385,366, Housey. The housing 10 further includes a slot or socket 13 in the upper right-hand side for receiving a plug-in memory module 14. The memory module 14 may be a read-only-memory (ROM) or a random access memory (RAM) or a combination of both and is inserted within the socket 13 to make electrical connection to the data processing unit 15 within the housing 10 (FIG. 2).

The ROM portion of the plug-in memory 14 contains a data library for enabling the data processing unit 15 to accomplish some particular set of functional capabilities. It will be appreciated that a wide variety of data libraries may be provided in ROMs of respective memory modules 14 which may be readily substituted for each other by removing one such memory module 14. Thus, a wide range of functions may be performed by the data processing unit 15 of the calculator, each of which is accompanied by an appropriate set of function labels to the assigned to a specific group of definable-function keys of the keyboard 12 as will be hereinafter described. For example, one memory module may define the functions associated with scientific tasks, another module may define business-related functions, another module may define special engineering-related functions, etc.

The data processing unit 15 has its own built-in memory section including both read-only-memory and random access memory which may be referred to as the system memory 16. The system memory 16 of the data processing unit 15 likewise includes an appropriate set of function labels to be assigned to the definable-function keys. Where the data processing apparatus is an advanced scientific electronic calculator, as in one embodiment, the ROM of the system memory 16 would be provided with one or more sets of function labels for each of the standard operation applications contemplated for the calculator. Thus, the definable-function keys of the special group of keys included as part of the keyboard are subject to being labelled either via the ROM of a plug-in memory module 14 or by the ROM of the system memory 16.

In the illustrated embodiment of the invention, the group of special keys 20 includes a plurality of definable-function keys 21-25 arranged in a row beneath the display means 11. The display means 11 comprises a main display 26 on which data inputs from the keyboard 12 and/or computational results from the data inputs appear. The display means 11 further comprises a dedicated display portion 27 disposed beneath the main display 26 and in proximity to the underlying row of definable-function keys 21-25 comprising the group 20 of special keys whose functions and the labels therefor may be interactively altered in accordance with the present invention. The dedicated display portion 27 is preferrably marked off from the main display by a frame 30 which defines a plurality of display windows in the dedicated display portion 27. The display windows 31-35 correspond to the definable-function keys 21-25 and are respectively vertically aligned in registration with the special key corresponding thereto. Thus, each special key 21-25 has its own particular display window 31-35 of the dedicated display portion 27 as a site for the particular function label symbol assigned to that special key. Since the display windows 31-35 of the dedicated display portion 27 are located just above the respective special keys 21-25 to which they correspond, the function-identifying symbols applied to the display windows 31-35 are readily perceived by the operator of the calculator to be the labels for the special keys 21-25. The frame 30 defining the display windows in the dedicated display portion 27 is preferrably opaque, being frosted glass or plastic depending upon the material of the transparent viewing panel of the display means 11.

The embodiment of the keyboard layout with identifying labels applied to individual keys as shown in FIG. 1 is but one arrangement suitable for use with the electronic calculator in accordance with the present invention. It will be observed that the keys marked F1-F5 of FIG. 1 are the definable-function keys 21-25 of the special group of keys 20. Furthermore, the function label on each key of the keyboard 12 other than the special group of keys 20 is the primary function for that key, and the upper label above the key is the second function or alpha mode character for that key. The characters or symbols which are shown above some of the keys are the shifted or second function character in alpha mode. In the latter respect, the shift key ordinarily used to provide a capital letter from an alphabet key which is depressed is depressed to change the status of certain keys to their second function as shown by the labels appearing above these keys.

As previously explained, the definable-function keys 21-25 may be assigned a function and provided with a label identifying that function via either the system memory 16 or the plug-in memory module 14 as inserted within the socket 13. In addition, the present invention enables key-labelling of the definable-function keys F1-F5 (i.e. keys 21-25) in a user-devised program and to define the program labels where execution of the program will begin when one of these keys F1-F5 is pushed. To this end, a DFN function is provided The DFN function has several options, as follows:

| DFN CLR | clears all definable-function keys |
| DFN Fx CLR | clears the definition for one key |
| DFN Fx GGG FF | defines one key Fx to be labelled GGG in the display window and to begin execution at program label FF |

Fx = keys F1-F5
GGG = ASCII display label
FF = ASCII program label

The keyboard 12 further includes a DFN function key 36 generally described as a mode-define key which is used for entering the defined DFN function into a user-devised program. Further, the keyboard 12 includes a plurality of application mode keys or menu keys 37 for performing a designated group of key-function data inputs. Each of the application mode keys 37 upon actuation enables each of the definable-function keys F1-F5 to be individually assigned a function label in a tree structure such that each definable-function key may have a different function attributable thereto for each of the application mode keys 37. As shown in FIG. 1, the application mode keys or menu keys 37 are aligned in the penultimate row of keys on the keyboard 12 and include the following keys:

| I/O | input/output |
| FILES | data files |
| STAT | statistics |
| CONV | conversions |
| NUM | numeric functions |
| FLAGS | flag manipulation |
| TESTS | conditional tests |
| FUNC | system functions |

| LISTS | list categories |
|---|---|

-continued

An example using the "CONV" (conversions) menu key 37 is described hereinafter in conjunction with FIGS. 3a–3e.

It will be understood that the data processing unit 15 (which may be a microprocessor, such as integrated circuit TMS 70C46 available from Texas Instruments Incorporated of Dallas, Texas, for example) includes a function label-assigning means as a suitable command signal generator responsive to the DFN function as provided by the function-defining mode key 36 in a user-deviced program or the application mode keys 37 in a system operation program to assign a function label to each selected definable-function key F1–F5 (keys 21–25). Graphics means 38 is operably coupled to the function label-assigning means of the data processing unit 15 and is electrically connected to the display means 11 for driving the display means 11 to provide visual symbols as labels on each of the display windows 31–35 of selected special keys F1–F5 indicative of the function assigned thereto. The graphics means 38 may comprise any display drive circuit suitable for selectively energizing components of the display means 11 to provide visible alphanumeric symbols as appropriate.

The electronic calculator is provided with a suitable power supply (not shown) which may be either line-connected to a source of alternating current or may be one or more batteries. In the illustrated embodiment, the calculator is of a size so as to be of the hand-held type and its housing 10 has a provision on the bottom thereof for a removable cover exposing a battery chamber when removed. Thus, batteries may be readily replaced when they have been discharged during prolonged use of the calculator.

By way of example, the definable-function keys F1–F5 may be used in specific problems such as:

EXAMPLE

Find the number of liters in 5 gallons.

Figure 3A:
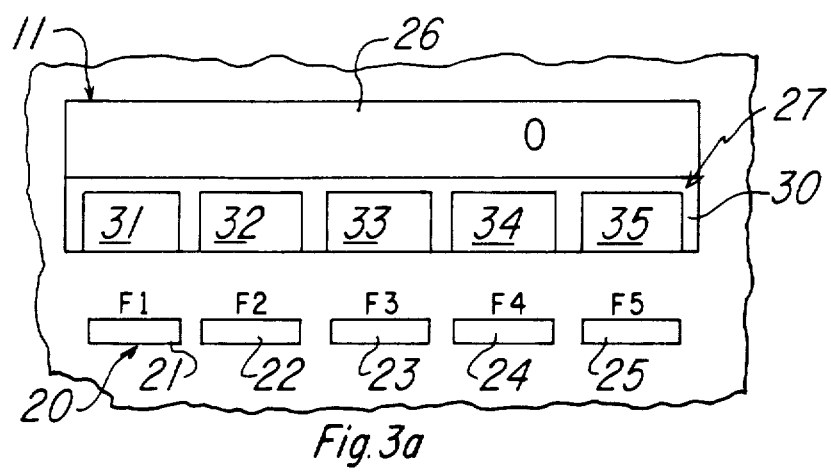
FIGS. 3a-3e are enlarged partial plan views of the calculator shown in FIG. 1, illustrating the display thereof and a dedicated display portion in association with a group of definable-function keys with labels assigned to specific keys in the group visually appearing in the dedicated display portion.

Referring to FIGS. 3a–3e of the drawings, the sequential operation as performed by the system memory 16 in association with the data processing unit 15 will be described in illsutrating how the definable-function keys F1–F5 (21–25) are provided with an assigned function and are labelled with a visual symbol in the corresponding display window 31–35 of the dedicated display portion 27 corresponding thereto. In FIG. 3a, the on button on the keyboard 12 has been pressed to actuate the electronic calculator, and the actuated state of the calculator is identified by the symbol "0" appearing in the main display 26 of the display means 11. The conversion key CONV (i.e. an application mode or menu key 37) of the keyboard 12 is then depressed, and the display means 11 takes on the form illustrated in FIG. 3b. In this state, the main display 26 identifies the system program application to be performed by the legend "CONVERSIONS", while the respective window displays 31–35 of the dedicated display portion 27 visually show the following legends for the respective definable-function keys F1–F5:

| Key | Label | | | Meaning |
|---|---|---|---|---|
| F1 | M | E | T | METRIC CONVERSIONS |
| F2 | D | R | G | DEGREES, RADIANS, GRADS |
| F3 | D | M | S | DEGREES, MINUTES, SECONDS |
| F4 | P | — | R | POLAR TO RECTANGULAR |
| F5 | B | A | S | NUMBER BASE CONVERSIONS |

Thereafter, the definable-function key F1 (key 21) is pressed to indicate that a metric conversion is desired. As depicted in FIG. 3c, the main display 26 now shows the legend "METRIC CONV.", whereas the respective display windows 31–35 of the dedicated display portion 27 now show the symbol labels, as follows:

| Key | Label | | | Meaning |
|---|---|---|---|---|
| F1 | F | — | C | FAHRENHEIT - CENTIGRADE |
| F2 | G | — | L | GALLONS - LITERS |
| F3 | # | — | K | POUNDS - KILOGRAMS |
| F4 | I | — | C | INCHES - CENTIMETERS |
| F5 | F | — | M | FEET - METERS |

Figure 3D:
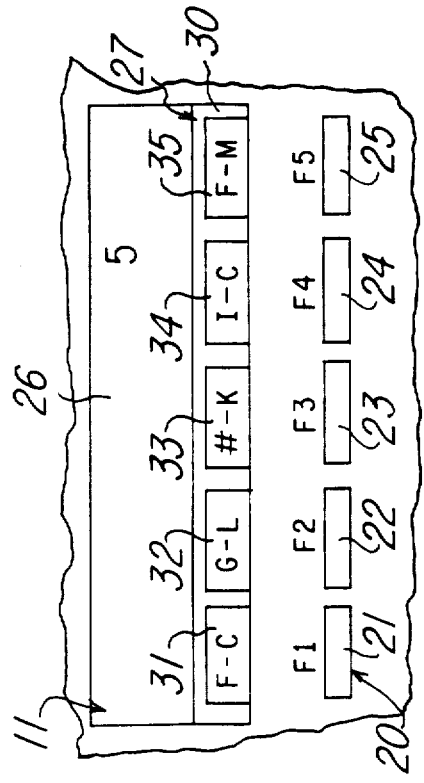

Thereafter, since the problem is expressed as finding the number of liters in 5 gallons, the key representing the number "5" is pressed, and the number "5" is displayed in the main display 26, as depicted in FIG. 3d.

Figure 3E:
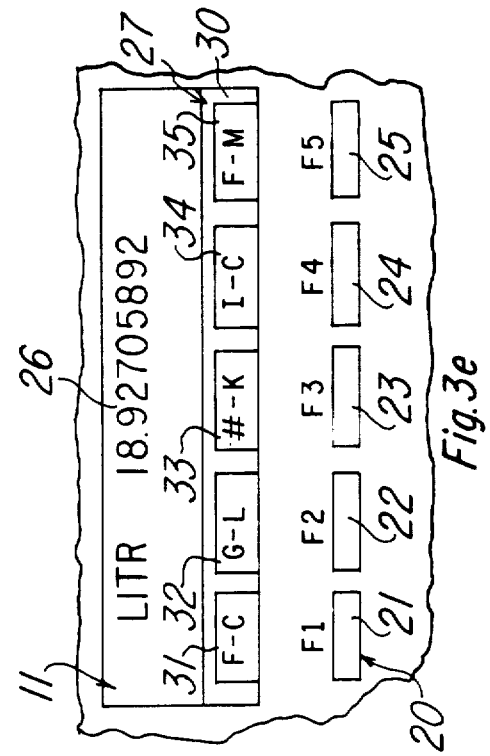
Figure 3B:
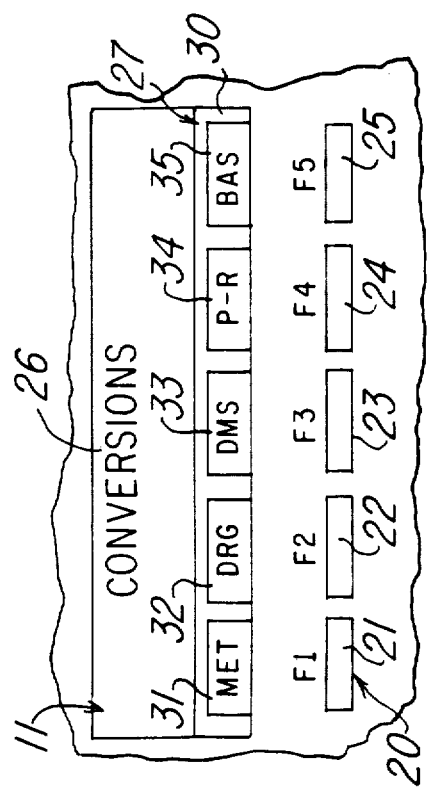
Figure 3C:
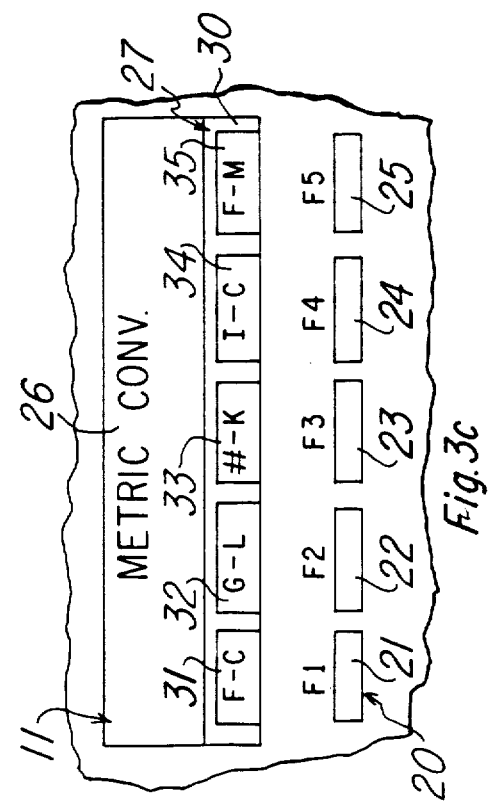

Since the definable-function key F2 (key 22) is effective to provide the conversion from gallons to liters, it is then pressed, and the computational result is displayed in the main display 26 as "LITR 18.92705892", as shown in FIG. 3e.

The symbols used in the foregoing example are defined in accordance with the CONV key program application function, i.e. conversions. Redefinable-function labels for the definable-function keys 21–25 as adopted for use with specific application mode or menu keys 37 found on the illustrated embodiment of the keyboard 12 of the electronic calculator shown in FIG. 1 are as follows:

| | | | | |
|---|---|---|---|---|
| | | | CS1 | 1 VARIABLE STATISTICS |
| | CLR | CLEAR STATISTICS REGISTERS | CS2 | 2 VARIABLE STATISTICS |
| | FRG | FREQUENCY FOR ENTRY | | |
| | MN | MEAN | (1 VARIABLE) | |
| STAT | M-B | SLOPE - INTERCEPT | N | NUMBER OF POINTS |
| (STATISTICS) | S | STANDARD DEVIATION | Sx | SUM OF X'S |
| | R | CORRELATION COEFFICIENT | Sxx | SUM OF X 2'S |
| | Y' | PREDICTED Y VALUE | Lx | LAST X ENTERED |
| | SHW | SHOW STATISTICS VALUES | LFR | LAST FREQUENCY |
| | | | (2 VARIABLE) | |
| | INT | INTEGER | N | NUMBER OF POINTS |
| | FRC | FRACTION | Sx | SUM OF X'S |
| | R# | RANDOM NUMBER | Sy | SUM OF Y'S |
| NUM | RND | ROUND INTERNAL VALUE | Sxy | SUM OF XY'S |
| (NUMBERIC | SGN | SIGNUM | Sxx | SUM OF X 2'S |
| FUNCTIONS) | LCM | LEAST COMMON MULTIPLE | Syy | SUM OF Y 2'S |
| | PF | PRIME FACTORS | LFR | LAST FREQUENCY |

-continued

| | | | | | |
|---|---|---|---|---|---|
| | ABS | ABSOLUTE VALUE | | Ly | LAST Y ENTERED |
| | PUT | PUT PGM OR DATA IN FILES | | | |
| | GET | GET PGM OR DATA FROM FILES | | | |
| FILES | CAT | CATALOG DIRECTORY | | | |
| | CD | CLEAR DIRECTORY | | | |
| | CF | CLEAR FILE | | | |
| | NAM | NAME MODULE | | | |
| | | | | RD | READ FROM TAPE |
| | TAP | TAPE STORAGE FUNCTIONS | | WRT | WRITE FROM TAPE |
| | | | | VFY | VERIFY TAPE |
| | CIO | CALL I/O SUBROUTINE | | | |
| | | | | DEV | PRINTER DEVICE # |
| I/O | PRT | PRINTER SETUP | | WID | PRINTER WIDTH |
| (INPUT/ | | | | WS | WORD BREAK AT |
| OUTPUT) | KW | KEY WAIT | | | END OF LINE |
| | IF> | IF GREATER THAN | | | |
| | IF< | IF LESS THAN | | | |
| TESTS | IF= | IF EQUAL | | | |
| (CONDITIONAL | DSZ | DECREMENT AND SKIP IF ZERO | | | |
| TESTS) | Y/N | YES/NO INPUT TEST | | | |
| | STB | STORE BYTE | | | |
| FUNC | RCB | RECALL BYTE | | | |
| (SYSTEM | SBA | SUBROUTINE ASSEMBLY LANGUAGE | | | |
| FUNCTIONS) | | | | | |
| | DEL | DELETE ALPHA CHARACTER | | | |
| | INS | INSERT ALPHA CHARACTER | | | |
| | CHR | ENTER ASCII CHARACTER "###" | | | |
| ALPHA | LC | SET LOWER CASE MODE | | | |
| | RCA | RECALL ALPHA REGISTER | | | |
| | STA | STORE ALPHA REGISTER | | | |
| | MRG | MERGE ALPHA REGISTER | | | |
| | COL | MOVE CURSOR TO COLUMN "##" | | | |
| | | | | F-C | FAHRENHEIT-CENTIGRADE |
| | | | | G-L | GALLONS-LITERS |
| | | | | #-K | POUNDS-KILOGRAMS |
| | MET | METRIC CONVERSIONS | | I-C. | INCHES-CENTIMETERS |
| | | | | F-M | FEET-METERS |
| CONV | DMS | DEGREES, MINUTES, SECONDS | | | |
| (conversions) | | | | D-R | DEGREES TO RADIANS |
| | ANG | DEGREES, RADIANS, GRADS | | D-G | DEGREES TO GRADS |
| | | | | R-G | RADIANS TO GRADS |
| | P-R | POLAR TO RECTANGULAR | | DEC | DECIMAL |
| | | | | HEX | HEX |
| | BAS | NUMBER BASE CONVERSIONS | | OCT | OCTAL |
| | | | | 2sC | 2's COMPLEMENT |
| | | | | UN | UNFORMATTED |
| | CLR | CLEAR | | | |
| FLAGS | SF | SET FLAG | | | |
| | RF | RESET FLAG | | | |
| | TF | TEST FLAG | | | |
| | REG | LIST REGISTERS | | | |
| LISTS | PGM | LIST PROGRAM | | | |
| | LBL | LIST PROGRAM LABELS | | | |
| | ST | LIST MACHINE STATUS | | | |

A function key memory map for the disclosed embodiment is provided for each of a system-defined application and a user-defined application. In the latter connection, it will be understood that the user-defined application will also apply to the use of an external memory module 14 which has a particular data library included in ROM. The following organization is utilized.

| SYSTEM | F1 DISPLAY | F1 ADDRESS | |
|---|---|---|---|
| DEFINED | F2 DISPLAY | F2 ADDRESS | |
| | F3 DISPLAY | F3 ADDRESS | |
| | F4 DISPLAY | F4 ADDRESS | |
| | F5 DISPLAY | F5 ADDRESS | |
| USER | F1 DISPLAY | F1 FLAG | F1 ADDRESS |
| DEFINED | F2 DISPLAY | F2 FLAGS | F2 ADDRESS |
| | F3 DISPLAY | F3 FLAGS | F3 ADDRESS |
| | F4 DISPLAY | F4 FLAGS | F4 ADDRESS |
| | F5 DISPLAY | F5 FLAGS | F5 ADDRESS |

The RAM in system memory 16 may be provided with a dedicated location for each of the key-labels with an associated address in a physically adjacent location with respect thereto in the system memory 16. A second set of user-label and associated addresses may likewise be assigned to physically adajcent dedicated locations in the system memory 16 which may be adjacent to the first set of dedicated locations if desired. In the adopted embodiment of the calculator, the system-defined RAM allocation is as follows.

| Byte # | Contents |
|---|---|
| 1-3 | Display characters |
| 4-6 | Address of routine for key F1 |

Bytes 1-6 are repeated for keys F2-F5.
The user-defined RAM allocation takes the following form.

| Byte # | Contents |
|---|---|
| 1-3 | Display characters |
| 4 | Flags  0=key F1 not defined |

| Byte # | Contents | |
|---|---|---|
| | 7 | 1=label addressing, 0=absolute addressing |
| | 6 | 1=defined from library cartridge |
| | 5 | 1=defined from user program area |
| | 4 | 1=defined from a program file |
| | 3-1 | Not used |
| | 0 | 1=file in RAM cartridge. 0=file on board |
| 5-7 | File name (if program file) | |
| 8-9 | Label or address of routine for key F1 | |

Bytes 1-9 repeated for keys F2-F5.

The definable-function keys F1-F5 can be defined by the system, the user or operator, or may be undefined. The user-DFN-in effect and system-DFN-in-effect flags determine which set of definitions is used. If neither of these two flags is on, pressing any of the keys F1-F5 has no effect. The user definitions for the keys F1-F5 can be recalled at any time, even if the system has redefined them, because two separate areas of RAM are used for the definitions.

The function key definitions for the definable-function keys F1-F5 can be cleared as a group by executing DFN and CLR, or individually by executing (DFN Fx CLR). The keys F1-F5 are defined one key at a time by executing (DFN Fx:ddd@aa), where odd represents the characters to be displayed in the appropriate display window of the dedicated display portion, and aa is the label of the routine to be executed when Fx is next pressed.

With respect to the use of replaceable plug-in memory modules 14 with the electronic calculator, it will be understood that the substitution of one such memory module 14 for a memory module as inserted in the electrical socket 13 will change the data library provided by such a memory module such that the function-defining means of the system operation is effective to assign a function label to each of the definable-function keys 21-25 reflecting the character of the data stored in the read-only-memory portion of the plug-in memory module 14.

Figure 4A:
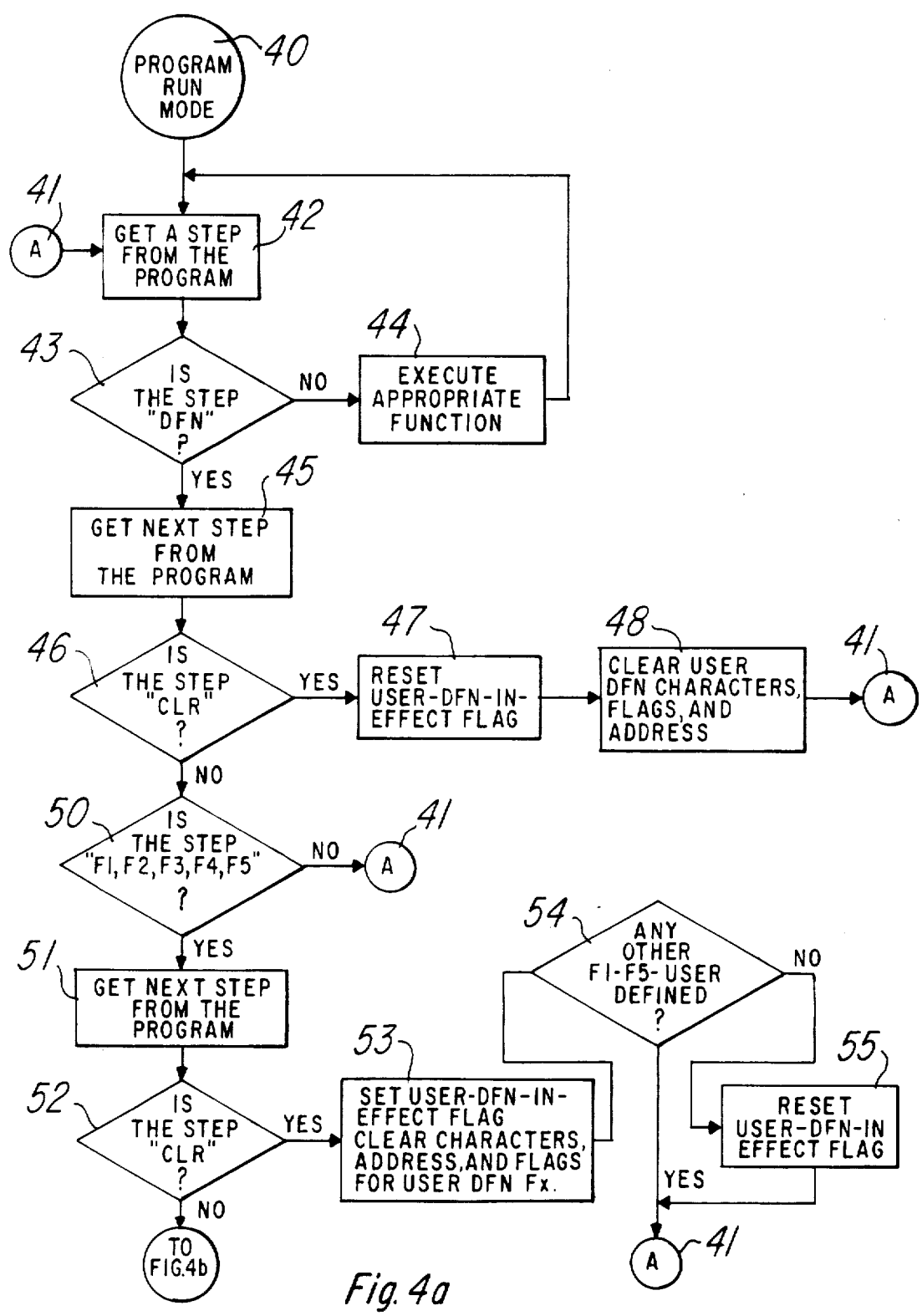
FIGS. 4a and 4b comprise a flow chart showing a calculator operated procedure for executing an operator-devised program in the re-labelling of the definable-function keys such that the respective functions assigned to the special keys may be identified and displayed to the operator to facilitate running of the program on the calculator.

The third technique available in the electronic calculator according to the present invention for changing the functions to be assigned to the definable-function keys 21-25 is via an operator-defined program. A calculator-operated procedure for executing a user-devised program is illustrated in the flow chart comprising FIGS. 4a and 4b. However, it will be understood that the same operating procedure is applicable to the execution of a system program wuch as initiated by pressing an application mode key or menu key 37 or as introduced by a memory module 14. Minor differences may include the program source being maintained in ROM rather than RAM. Referring to FIG. 4a, the user-devised program is initiated by pressing the "RUN" key on the keyboard 12 as at 40 to initiate the program. Thereafter, the data processing unit 15 accesses a step from the program source A as at 41, the program source being maintained in a random access memory (RAM) portion of the internal system memory 16, and the accessing of a step from the program being shown at 42. The procedure then compares the accessed step with a predetermined data signature indicative of the function attributed to the mode-define key "DFN" as at 43. If the step is not the "DFN" function, the appropriate function called for by the step is executed as at 44, and the procedure loops back to access another step from the program in the manner previously described. If the step is the "DFN" function, the procedure continues along the "yes" data path, and the next step is accessed from the program as at 45. This program step is compared to the data definition for the "CLR" function as at 46. If the comparison establishes that the step represents the "CLR" function, the procedure continues along the "yes" data path to reset the user-DFN-in-effect flag as at 47, the user-DFN characters, flags, and addresses are cleared as at 48, and the procedure returns to the program source A as at 41.

If the decision is made that the program step at 46 is some function other than the function "CLR", the procedure continues along the "no" data path to a subsequent decision block 50 for determining whether the step represents the function to be defined for any of the special keys F1-F5. If the step does not conform to the function for any of the special keys F1-F5, the procedure continues along the "no" data path and returns to the program source A as at 41. If the decision is that the step is a definable function for any of the special keys F1-F5, the procedure continues along the "yes" data path, and the next step is accessed from the program as at 51. The procedure then reinstitutes a determination as to whether this subsequent step has the function "CLR" as at 52. If the answer is "yes", the user-DNF-in-effect flag is set, and the characters, address and flags for a single user DFN definable-function key Fx are cleared as at 53. Thereafter, a decision is made as at 54 as to whether any other special keys F1-F5 are user-defined as to their functions. If "no", the user-DFN-in-effect flag is reset as at 55 and the procedure returns to the program source A as at 41. If there are other special keys F1-F5 whose functions are user-defined, the procedure continues along the "yes" data path from the decision block 54, returning to the program source A as at 41.

Figure 4B:
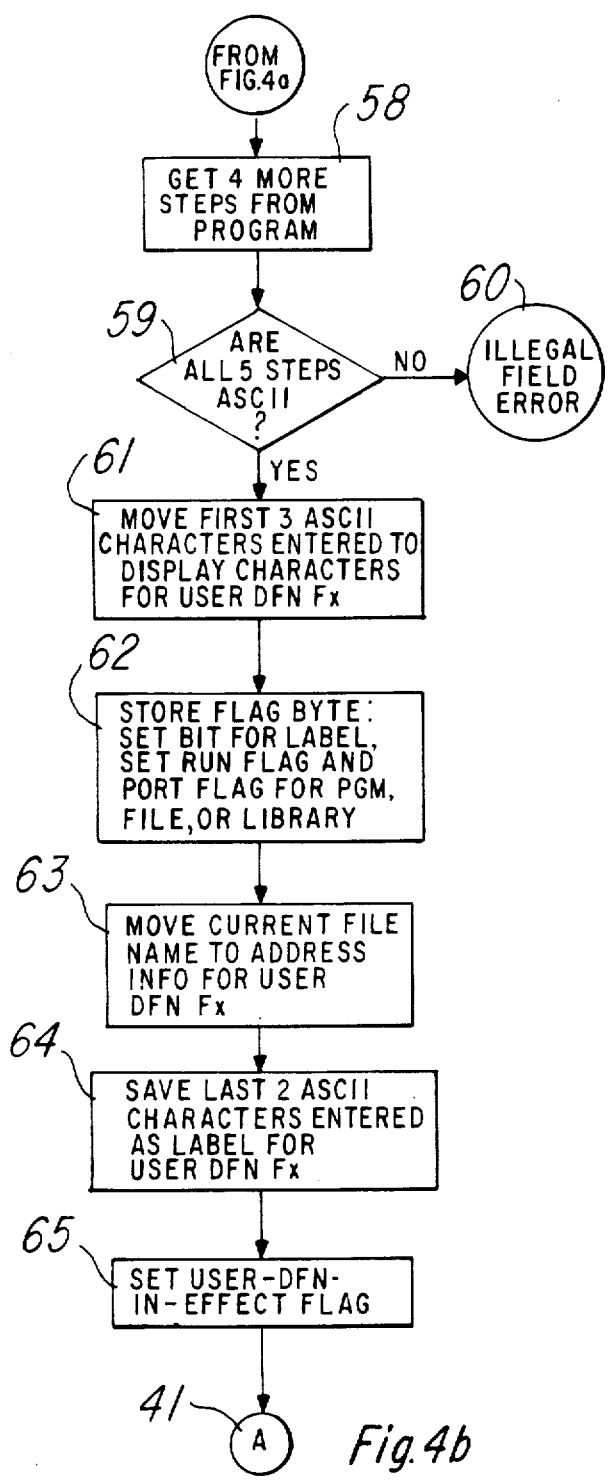

From the decision block 52, if it is determined that the program step in question is not the function "CLR", the procedure continues along the "no" data path which is continued in FIG. 4b. The procedure then accesses four more steps from the user-defined program as at 58. The total of five steps is then subjected to a comparison with the data format thereof as at 59 to determine whether all five steps are in the ASCII code. If "no", an illegal field error as at 60 occurs, and the user must restate the user-devised program to place it in the proper code format, in this instance requiring the data of the program steps to be described in ASCII code. If the decision from the comparison of the program steps to appropriate ASCII code as at 59 is "yes", the procedure continues so as to move the first three ASCII characters entered to display the characters for the user DFN special key Fx as at 61. Thereafter, an appropriate flag byte is stored, including bits for the label run, and port flags for the PGM (program), file, or library, are established as at 62. The current file name then is moved to the address information for the user DFN special key Fx as at 63, the last two ASCII characters are saved, being entered as the label for the user DFN special key Fx as at 64, and the user-DFN-in-effect flag is set as at 65, with the procedure then returning to the program source A as at 41. The user-devised program is now ready to be executed with the assigned functions to the function-definable keys 21–25 being subject to display in the appropriate window displays 31–35 as labels identifying the functions attributable to each special key 21–25 in accordance with the previously-described procedure illustrated in the flow chart of FIGS. 4a and 4b.

Using the procedure illustrated in flow chart form in FIGS. 4a and 4b, a program may be run in which labels are assigned to the respective special keys F1–F5 (keys 21–25) during execution of the program. For example, assume that the user-devised program is directed toward solving for the length of the hypotenuse side of a right triangle, with sides a and b. Such a program enables the sides a and b of the right triangle to be entered by using the appropriate definable-function keys therefor. Upon pressing <CAL>, the program calculates the length of the hypotenuse.

| PC= | Program Mnemonics | Comments |
|---|---|---|
| 0000 | 'ENTER SIDES' | Creates menu title |
| 0011 | DFN F1:a oSA | Defines F1 |
| 0018 | DFN F2:b oSB | Defines F2 |
| 0025 | DFN F5:CALoCH | Defines F5 |
| 0032 | HLT | Stops program and displays menu |
| 0033 | LBL SA | Labels segment |
| 0036 | STO A HLT | Stores side a in reg. A |
| 0039 | LBL SB | Labels segment |
| 0042 | STO B HLT | Stores side b in reg. B |
| 0045 | LBL CH | Labels segment |
| 0048 | (RCL A x 2 | Calculates hypotenuse |
| 0052 | +RCL B x 2) SQR | |
| 0058 | 'HYP=' | Creates alpha message |
| 0062 | COL 16 MRG ≐ | Merges result |
| 0066 | HLT | Stops program |

Thus, an electronic calculator has been disclosed in accordance with the present invention in which a plurality of definable-function keys F1–F5 (special keys 21–25 of FIG. 1) have been provided, the functions of which may be assigned and labeled via three different techniques —i.e. the calculator operating system, library application as provided by a specific plug-in memory module, and a user-devised program.

Although preferred embodiments of the invention have been specifically described, it will be understood that the invention is to be limited only by the appended claims, since variations and modifications of the preferred embodiments will occur to those skilled in the art.

We claim:

1. A data processing apparatus comprising:
a data processing unit for receiving data inputs and providing data outputs indicative of the data inputs and/or computation from such data inputs;
a keyboard coupled to said data processing unit and having a plurality of individual keys for providing data inputs to said data processing unit in response to actuation of individual keys;
said keyboard including a dedicated keyboard portion of said plurality of individual keys providig a plurality of dedicated definable-function keys distinct from the remaining plurality of individual keys of said keyboard, each of said dedicated definable-function keys being subject to recharacterization to any one of a plurality of different functions;
means for defining respective different specific functions assigned to each of said plurality of dedicated definable-function keys, said function-defining means including a mode-define key on said keyboard separate from said dedicated definable-function keys and operable upon actuation to enable data inputs from keys other than the dedicated definable-function keys to define the functions attributable to each said dedicated definable-function key;
said data processing unit including means responsive to said function-defining means to assign respective function labels to each of said plurality of dedicated definable-function keys, the function labels of each of said plurality of dedicated definable-function keys being replaceable by any one of a plurality of different function labels respectively corresponding to a different one of said plurality of functions to which each of said plurality of dedicated definable-function keys may be assigned by said function-defining means;
display means coupled to said data processing unit on which the data inputs from the actuation of individual keys and/or computations resulting from such data inputs visually appear, said display means including a dedicated display portion corresponding to said plurality of dedicated definable-function keys of said keyboard for visually indicatig a key label symbol for each of said plurality of dedicated definable-function keys defining the function attributable to each respective dedicated definable-function key; and
graphic means responsive to said function label-assigning means for providing visual symbols on said dedicated display portion of said display means as respective labels indicative of the functions assigned to each of said dedicated definable-funtion keys, said graphic means providing a different visual symbol on said dedicated display portion of said display means as a different label for each of said plurality of dedicated definable-function keys in response to the assignment of a respective different specific function to any one of said plurality of dedicated definable-function keys by said function-defining means, whereby each of said plurality of dedicated definable-function keys may be relabeled to be designated by a different visual symbol when any one of said plurality of dedicated definable-function keys is reassigned to a respective different specific function by said function-defining means.

2. A data processing apparatus as set forth in claim 1, wherein said keyboard further includes a plurality of application mode keys separate from said dedicated definable-function keys and operable upon selective actuation in performing a designated group of key-function data inputs, each said application mode key upon actuation enabling each of said plurality of dedicated definable-function keys to be individually assigned a function label in a tree structure hierarachy wherein each of said plurality of dedicated definable-function keys is individually assigned a first function label in a higher hierarchy stage and is subsequently individually assigned a different function label in a successive lower hierarchy stage such that each of said plurality of dedicated definable-function keys may have a different function attributable thereto at respective hierarchy stages for each of the plurality of application mode keys in response to the actuation thereof in the performance of respective groups of functions assignable to the plurality of dedicated definable-function keys.

3. A data processing apparatus as set forth in claim 1, further comprising:
   means defining a first plurality of functions respectively assignable to each of the remaining plurality of individual keys of said keyboard as a first set of functions and a second plurality of functions respectively assignable to each of the remaining plurality of individual keys of said keyboard as a second set of functions, the functions included in said first set of functions being different from the functions included in said second set of functions;
   at least one function-assigning key included in the remaining plurality of individual keys of said keyboard apart from said plurality of dedicated definable-function keys, said one function-assigning key having first and second status positions and being alternatively positioned in one of the first and second status positions upon actuation to assign said first set of functions to the remaining plurality of keys on said keyboard and actuatable to its other satus position to assign said second set of functions to said remaining plurality of keys on said keyboard.

4. A data processing apparatus as set forth in claim 1, wherein said dedicated display portion of said display means has a plurality of separate display windows respectively corresponding to each of said plurality of dedicated definable-function keys for visually indicating the respective key label symbols defining the functions attributable to each of said dedicated definable-function keys;
   each of said plurality of dedicated definable-function keys being arranged on said keyboard in the same localized area thereon in proximity to said display means, each of said plurality of dedicated definable-function keys being disposed adjacent to a respective dedicated display window in said dedicated display portion of said display means corresponding thereto in registration therewith; and
   said graphic means being effective to provide a visual symbol on each of said plurality of dedicated display windows of said dedicated display portion as respective labels indicative of the functions assigned to each of said dedicated definable-function keys, said graphic means providing a different visual symbol on each of said plurality of dedicated display windows as a different label for each of said plurality of dedicated definable-function keys in response to the assignment of a respective different specific function to any one of said plurality of dedicated definable-function keys by said function-defining means, whereby each of said plurality of dedicated definable-function keys may be relabeled to be designated by a different visual symbol when any one of said plurality of dedicated definable-function keys is reassigned to a respective different specific function by said function-defining means.

5. A data processing aparatus as set forth in claim 1, further including replaceable memory means coupled to said data processing unit and responsive to said function-defining means to assign a function label to each of said dedicated definable-function keys related to the substantive content of the data stored therein.

6. A data processing apparatus as set forth in claim 1, wherein said keyboard further includes program key means for selective actuation by an operator in defining an operator program, said function-defining means being responsive to the selective actuation by said operator by said program key means to assign respective function labels to each of said plurality of dedicated definable-function keys tailored to the use of dedicated such definable-function keys in carrying out the operator-defined program.

7. A data processing apparatus as set forth in claim 4, further including a housing in which said data processing unit is disposed, said keyboard being arranged on said housing below said display means;
   said display means being disposed on said housing to position the dedicated display portion thereof as the lower portion of said display means in juxtaposition with said plurality of dedicated definable-function keys therebelow, with each of said dedicated definable-function keys being positioned in vertically registering alignment with the corresponding dedicated display window of said dedicated display portion relating thereto.

8. A data processing apparatus as set forth in claim 7, wherein said apparatus is a hand-held electronic calculator.

* * * * *